US006125822A

United States Patent [19]

Janik et al.

[11] Patent Number: 6,125,822

[45] Date of Patent: Oct. 3, 2000

[54] TWO STAGE PRESSURE RELIEF VALVE

[75] Inventors: Leon P. Janik, Suffield; Michael J. O'Brien, Glastonbury, both of Conn.

[73] Assignee: Stanadyne Automotive Corp., Windsor, Conn.

[21] Appl. No.: 09/499,106

[22] Filed: Feb. 4, 2000

[51] Int. Cl.[7] ............................ F02M 37/04; F16K 15/06

[52] U.S. Cl. .......................... 123/457; 123/506; 123/514; 137/469

[58] Field of Search .................................... 137/469, 477; 123/456, 457, 458, 510, 511, 514

[56] References Cited

U.S. PATENT DOCUMENTS

| | | | |
|---|---|---|---|
| 3,626,975 | 12/1971 | Bobst | 137/469 |
| 4,949,746 | 8/1990 | Kay | 137/469 |
| 5,170,818 | 12/1992 | Hatzikazakis | 137/469 |
| 5,251,664 | 10/1993 | Arvidsson et al. | 137/469 |
| 5,558,063 | 9/1996 | Minagawa et al. | 123/457 |
| 5,560,343 | 10/1996 | Werkmann et al. | 123/506 |

*Primary Examiner*—Thomas N. Moulis
*Attorney, Agent, or Firm*—Alix, Yale & Ristas, LLP

[57] ABSTRACT

A two stage pressure relief valve for releasing a fluid under pressure includes a body having a bore extending from an inlet and terminating in an outlet. A first chamber which communicates with the inlet and a second chamber which communicates with the first chamber and the outlet are provided and are dimensioned such that the cross sectional area of the second chamber is greater than that of the first chamber. An operator seat is disposed within the body and an operator is moveably disposed within the bore and engages the operator seat. The operator includes a blocking surface which blocks at least a portion of the flow of fluid. When the pressure of the fluid exceeds a threshold pressure, the operator is unseated whereby fluid flows at a first flow volume such that at least a portion of the fluid impinges the blocking surface causing the blocking surface to move within the second chamber whereby fluid flows at a second flow volume. The second flow volume being greater than the first flow volume.

30 Claims, 7 Drawing Sheets

TWO STAGE PRESSURE RELIEF VALVE

FIELD OF THE INVENTION

The present invention relates to valves and, more particularly, to a relief valve which provides two stage pressure relief.

BACKGROUND OF THE INVENTION

Direct fuel injection has some distinct advantages over prior art systems with respect to emissions and fuel economy of an engine of a vehicle. This is mainly because of an increase in the efficiency of the engine.

Direct fuel injection systems may include a common rail which supplies individual injectors with fuel. The common rail is, in turn, supplied by a pump that generates a relatively high pressure, e.g., 2000 bar. One such pump is shown in U.S. patent application Ser. No. 09/031,859, filed Feb. 27, 1998, and entitled "Supply Pump For Gasoline Common Rail", which is assigned to the present assignee hereof.

For safety considerations, the common rail may be equipped with a pressure relief valve which functions to reduce pressure and, for example, return fuel to a fuel tank in the event that the pressure level in the common rail becomes excessive. In particular, where the pressure of the fluid within the common rail rises above a threshold pressure, fluid must be released in order to prevent a critical rupture.

It is also been found that once pressure within the common rail has risen above the threshold, continuous regulation of the fluid pressure is desirable to continue operation of the vehicle.

SUMMARY OF THE INVENTION

Briefly stated, the invention in one preferred embodiment contemplates a two stage pressure relief valve for releasing a fluid under pressure. The valve includes a body having a bore extending from an inlet and terminating in an outlet. A first chamber which communicates with the inlet and a second chamber which communicates with the first chamber and the outlet are provided and are dimensioned such that the cross sectional area of the second chamber is greater than that of the first chamber. An operator seat is disposed within the body and an operator is moveably disposed within the bore and engages the operator seat. The operator includes a blocking surface which blocks at least a portion of the flow of fluid. When the pressure of the fluid exceeds a threshold pressure, the operator is unseated whereby fluid flows at a first flow volume such that at least a portion of the fluid impinges the blocking surface causing the blocking surface to move within the second chamber whereby fluid flows at a second flow volume. The second flow volume being greater than the first flow volume.

In one particular aspect of the invention, the operator includes a generally cylindrical shape having a stepped outer surface which defines a first outer surface having a first outer diameter and a second outer surface having a second outer diameter. The first outer diameter is less than the second outer diameter and the blocking surface is disposed between the first outer surface and the second outer surface. The blocking surface may also extend in a perpendicular direction with respect to that of both the first and second outer surfaces.

In another aspect the threshold pressure may be on the order of between 1800 and 1900 bar.

It is an object of the present invention to provide a two stage pressure relief valve which is highly reliable and durable.

It is another object of the invention to provide a valve which relieves pressure and thereafter regulates pressure.

It is another object of the present invention to provide a pressure relief valve which ameliorates the problems of the prior art.

It is a further object of the present invention to provide a relief valve which is efficient and has a relatively low cost construction.

DETAILED DESCRIPTION OF THE PREFERRED EMBODIMENT

Figure 1:
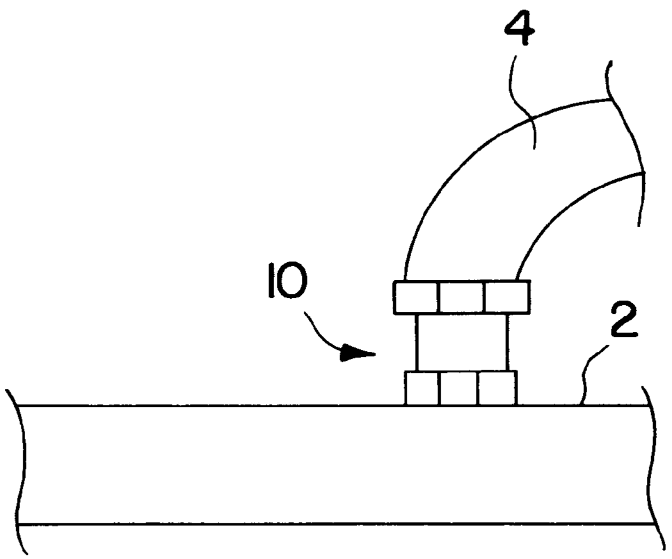
FIG. 1 is a partial side elevational view of a common rail, an outlet conduit and a two stage pressure relief valve in accordance with an embodiment of the present invention.

Referring to FIG. 1, a common rail 2 and outlet tube 4 are illustrated as being connected to a pressure relief valve in accordance with one embodiment of the invention shown generally at 10. The common rail 2 is interconnected with a vehicle engine (not shown) in a known manner. The outlet tube 4 may also connect to a vehicle fuel tank (also not shown).

Figure 2:
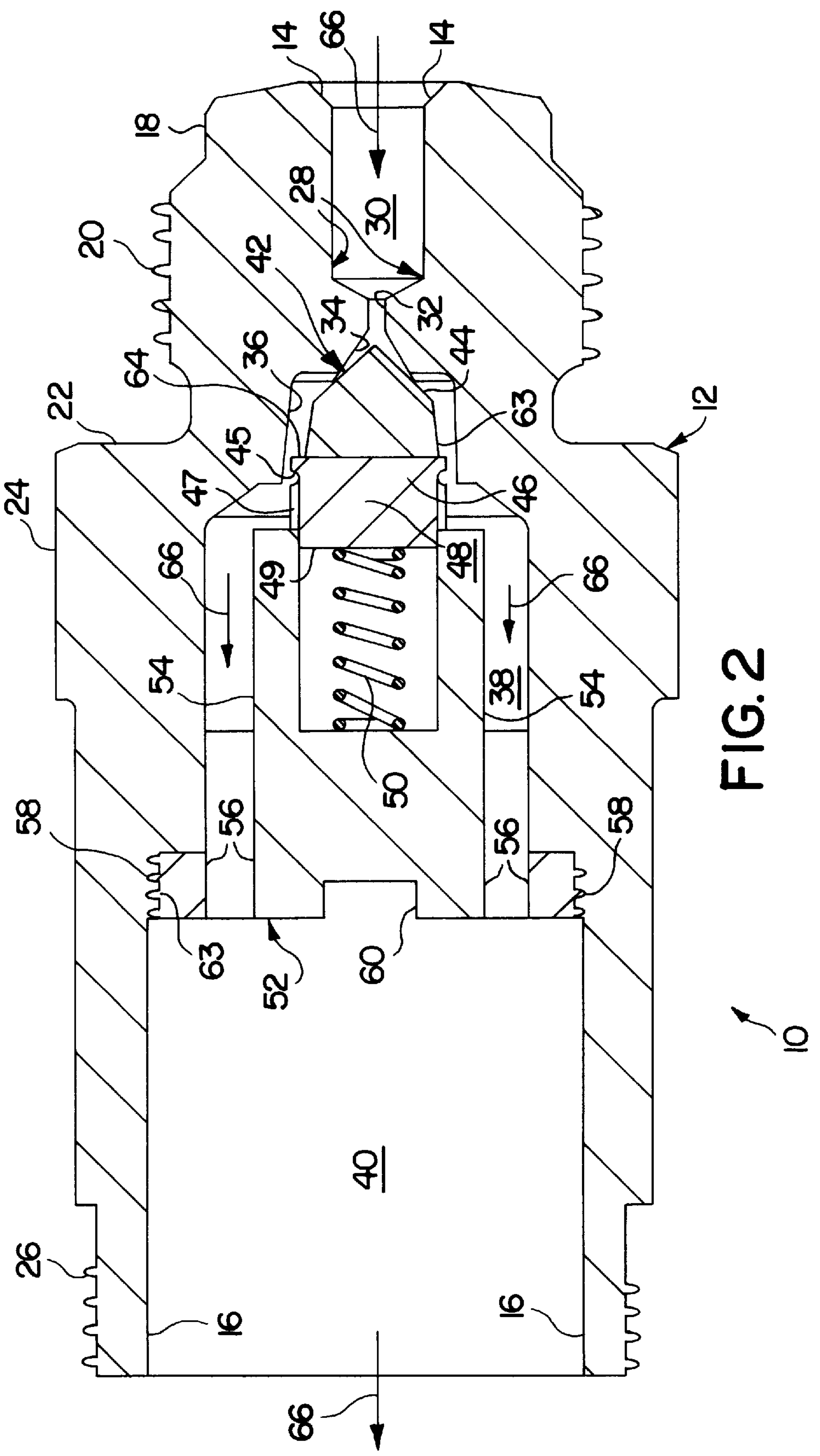
FIG. 2 is a central sectional view taken along the central axis of the two stage pressure relief valve of FIG. 1.

As illustrated in FIG. 2, the relief valve 10 includes a body 12, having an inlet 14 and an outlet 16. The body 12 is preferably formed of a sufficiently strong material, such as a steel, as the valve 10 must be capable of withstanding pressures on the order of 2000 bar. The body 12 includes a head 18 which may be threaded at 20 for fastening to a correspondingly threaded aperture of the common rail 2 (FIG. 1). It will be appreciated that a shoulder portion 22 may receive a sealing washer (not shown) for sealing purposes as is well known.

The body 12 may also include a contact section 24 and a connecting portion 26. The contact section 24 provides for engagement with a tool (not shown) for use in fastening the relief valve 10 to the common rail. The connecting portion 26 may include threads configured to receive, for example, the outlet tube 4 (FIG. 1) which provides a return path to the fuel tank or other fluid reservoir.

The fluid inlet 14 and outlet 16 are connected via a bore 28 which may extend along the longitudinal central axis of the relief valve 10. The bore 28 includes a mouth portion 30 which extends from the inlet 14 and communicates with a throat portion 32. An operator seat 34 is located between the throat portion 32 and a first chamber 36. A second chamber 38 extends from the first chamber 36 and is in fluid communication with an outlet chamber 40. In the direction of the fluid flow represented by arrows 66, fluid from the common rail 2 (FIG. 1) may enter the inlet 14 and when, as discussed in more detail below, the relief valve 10 is open, passes through the mouth portion 30 and throat portion 32 into the first, second and outlet chambers 36, 38, 40 to the outlet 16.

In accordance with a feature of the present invention, an operator 42 is moveably mounted for axial displacement within the bore 28. The operator 42 comprises a head 44, a circumferential groove 45, a base 46 and axial grooves 47. The base 46 includes an peripheral outer surface 48 and a receptacle surface 49. The receptacle surface 49 receives a bias or spring 50 which biases the operator 42 against the operator seat 34.

The spring 50 also contacts a perforated mounting support 52 which includes guide members 54, apertures 56, threads 58 and receptacle 60. The perforated mounting support 52 may be composed of any suitably strong and durable metallic material such as steel.

Figure 3:
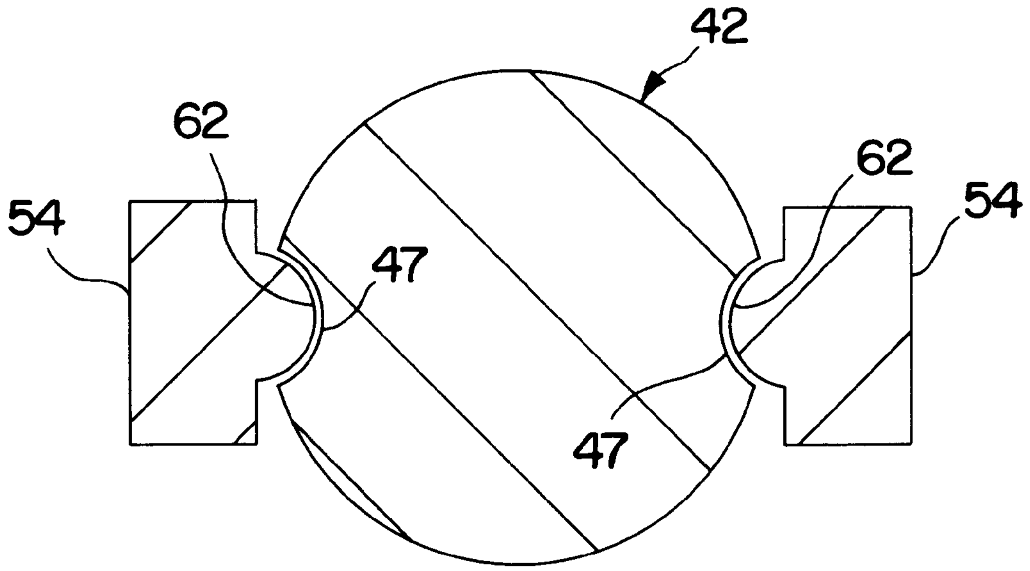
FIG. 3 is a partial cross sectional view of an operator and guide formed in accordance with an embodiment of the present invention.

Referring now also to FIG. 3, the guide members 54 function to ensure linear movement of the operator 42. To achieve this, tongues 62 and axial grooves 47 are provided on the guide members 54 and operator 42, respectively. It will be understood that while the tongues 62 and axial grooves 47 are arcuate in cross sectional geometry they both may comprise other configurations such as rectangular. Circumferential groove 45 may function as a reservoir for ensuring that the axial grooves 47 remain lubricated.

The apertures 56 function to allow fluid communication between the second chamber 38 and the outlet chamber 40. Threads 58 may engage correspondingly shaped grooves 63 disposed in the outlet chamber 40. The receptacle 60 provides for receipt of a tool or the like (not shown) for installing the mounting support 52 during assembly thereof. Any suitable means may be provided for performing this function.

The operator 42 may be composed of any suitably strong and durable material such as steel and the head 44 is shaped to complement the operator seat 34 and is illustrated as being conical. The head 44 extends from the base 46 and is illustrated as having a smaller outer diameter at its largest extent than the outer surface 48 of the base 46 and thereby defining a blocking surface 64 therebetween. The blocking surface 64 is generally perpendicular to the outer surface 48.

In operation, fluid received from the common rail 2 (FIG. 1) flows in the direction of arrows 66 and engages the head 44 of the operator 42. Once the pressure of the fluid rises above a threshold level, such as on the order of about 1800–1900 bar, the operator 42 will move axially such that the head 44 is unseated from the operator seat 34.

Figure 4:
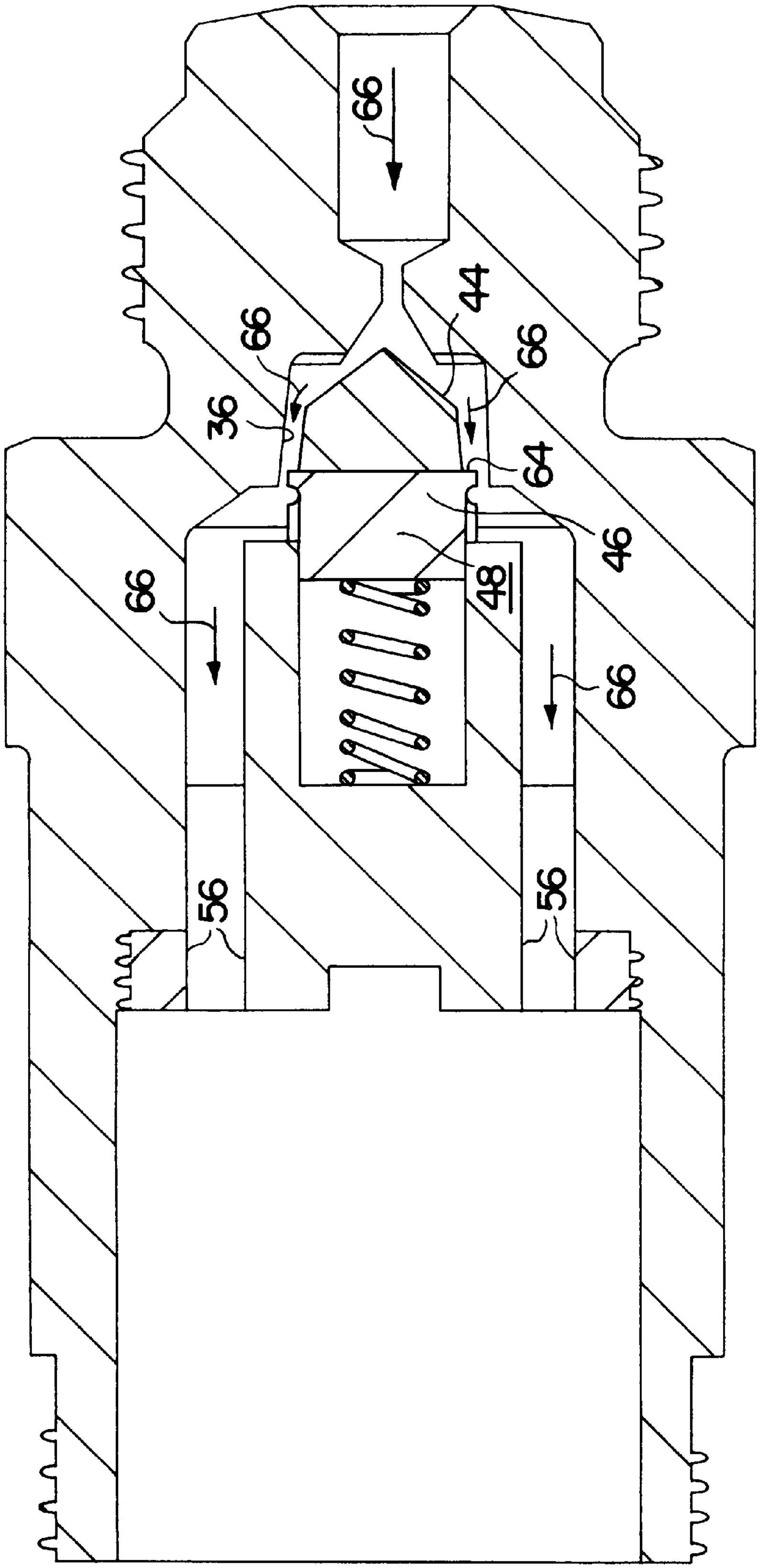
FIG. 4 is a view similar to that of FIG. 1 illustrating opening of the pressure relief valve to provide a first stage of pressure relief.

Referring now to FIG. 4, the operator 42 has moved in the direction of arrows 66, whereby the head 44 is unseated and fluid may engage and thereafter impinge on and pass around blocking surface 64 and the outer surface 48 of the base 46 within the first chamber 36. Because of the relative sizes of the blocking surface 64, the first chamber 36 and the outer surface 48, the flow of fluid is limited in volume. It is desired that this particular volume be approximately 15 liters per hour (3.96 gal/hr). The output pressure of this first flow volume may range from about 300 to about 600 bar.

Figure 5:
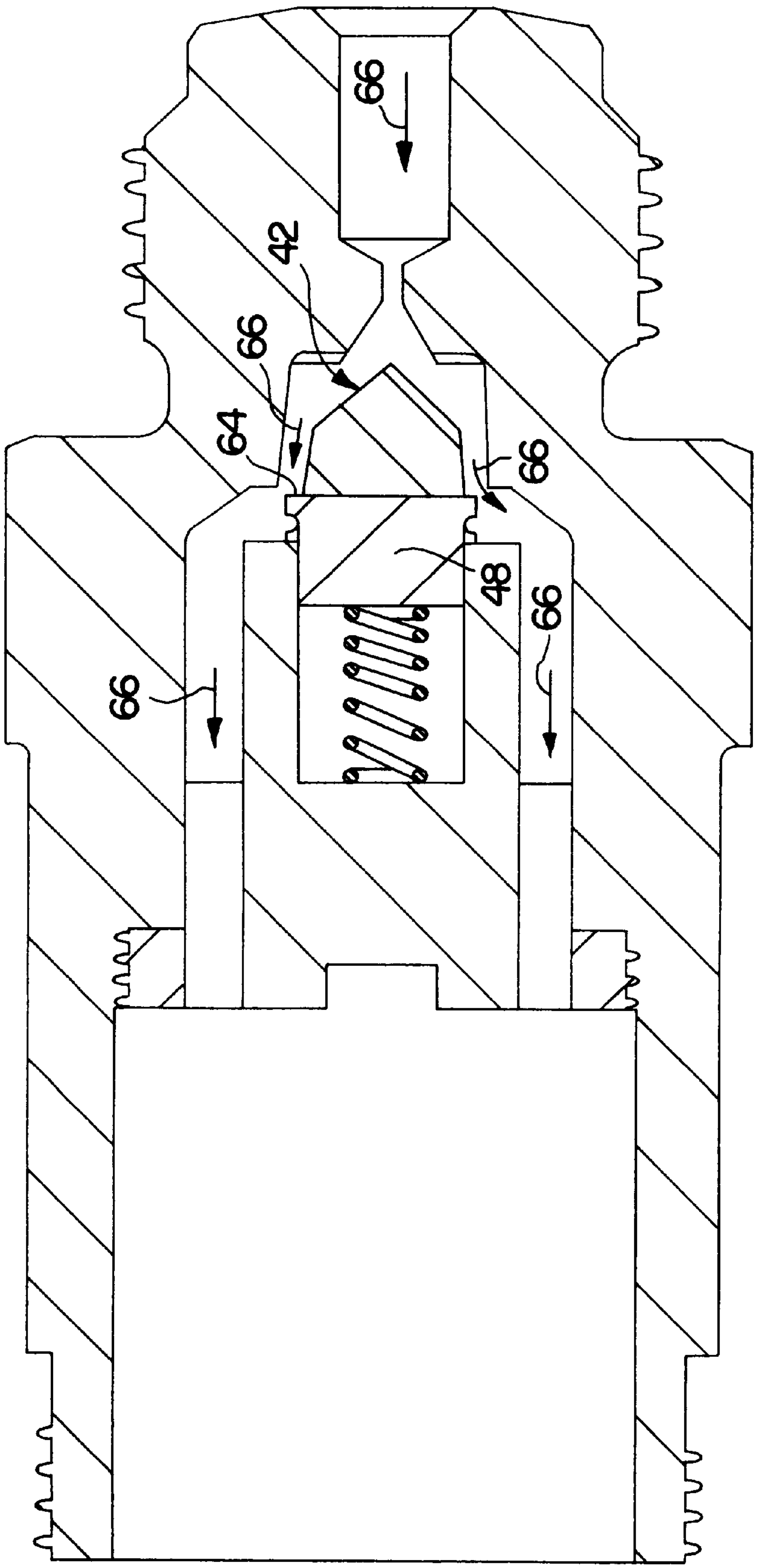
FIG. 5 is a view similar to that of FIG. 1 illustrating opening of the pressure relief valve to provide a second stage of pressure relief.

Returning now to FIG. 5, because fluid now impinges against the blocking surface 64, in addition to the head 44, additional force is applied to the operator 42 causing the operator to be moved an additional distance whereby the blocking surface 64 is disposed within the second chamber 38 allowing fluid to flow at a greater volume through the valve. This volume is desired to be on the order of 350 liters per hour (92.46 gal/hr) and at a pressure on the order of from about 820 to about 1120 bar.

With the high flow volume provided, the pressure within the common rail 2 is reduced to a maximum of between 820 and 1120 bar. Should the pressure in the common rail drop below about 820 bar but remain above about 300 bar, the operator 42 will return to a position such that the blocking surface 64 will be located again within the first chamber 36 thereby reducing fluid volume output. Once the pressure level drops below about 300 bar, the operator 42 will again seat. In view of the foregoing, the valve performs both functions of pressure relief and pressure regulation thereby providing for continuous valve operation. Accordingly, operation of the vehicle engine (not shown) may continue, although at a less than optimal performance.

Figure 6:
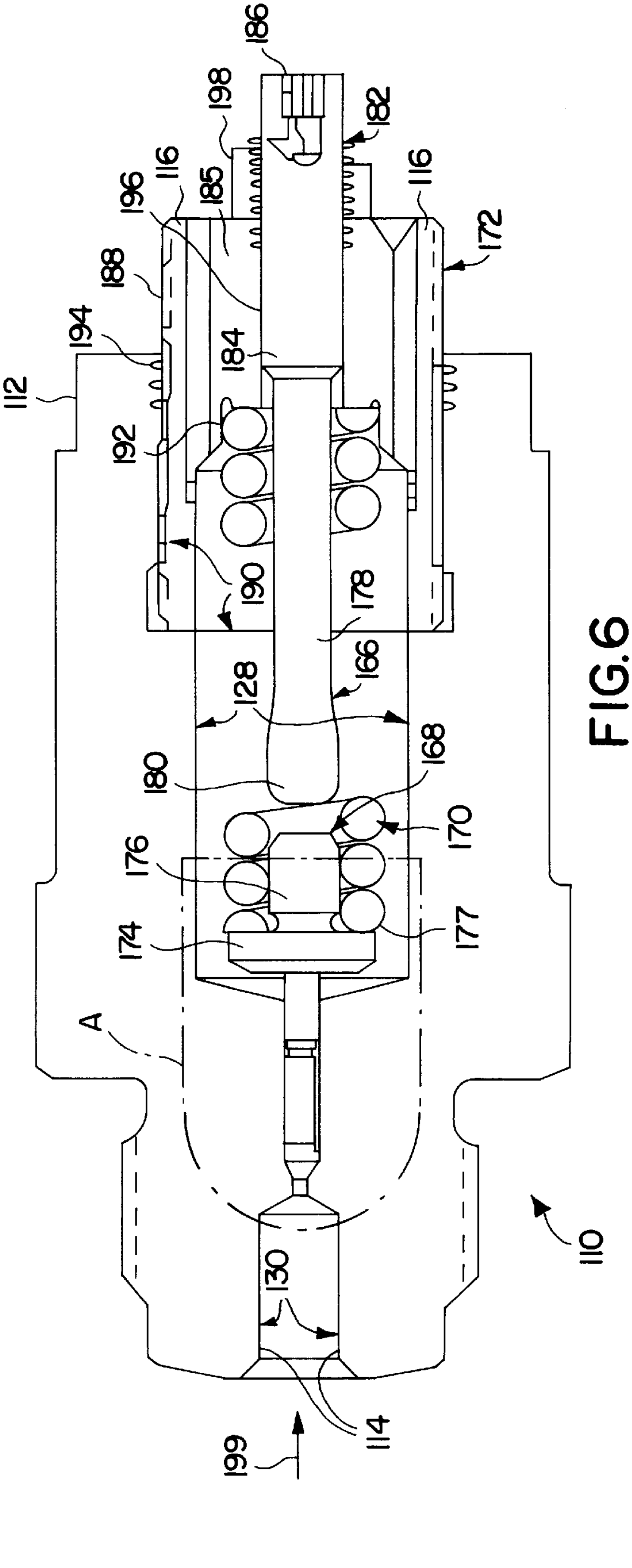
FIG. 6 is a central sectional view, partly in schematic, taken along a central longitudinal section of a two stage pressure relief valve in accordance with another embodiment of the present invention.

In FIG. 6, a two stage relief valve in accordance with another embodiment of the present invention is illustrated generally at 110. The valve 110 comprises a body 112, inlet 114 and outlet 116. The body may be similar to that discussed above with respect to FIG. 2 and thus reference may be had above for discussion thereof.

Figure 6A:
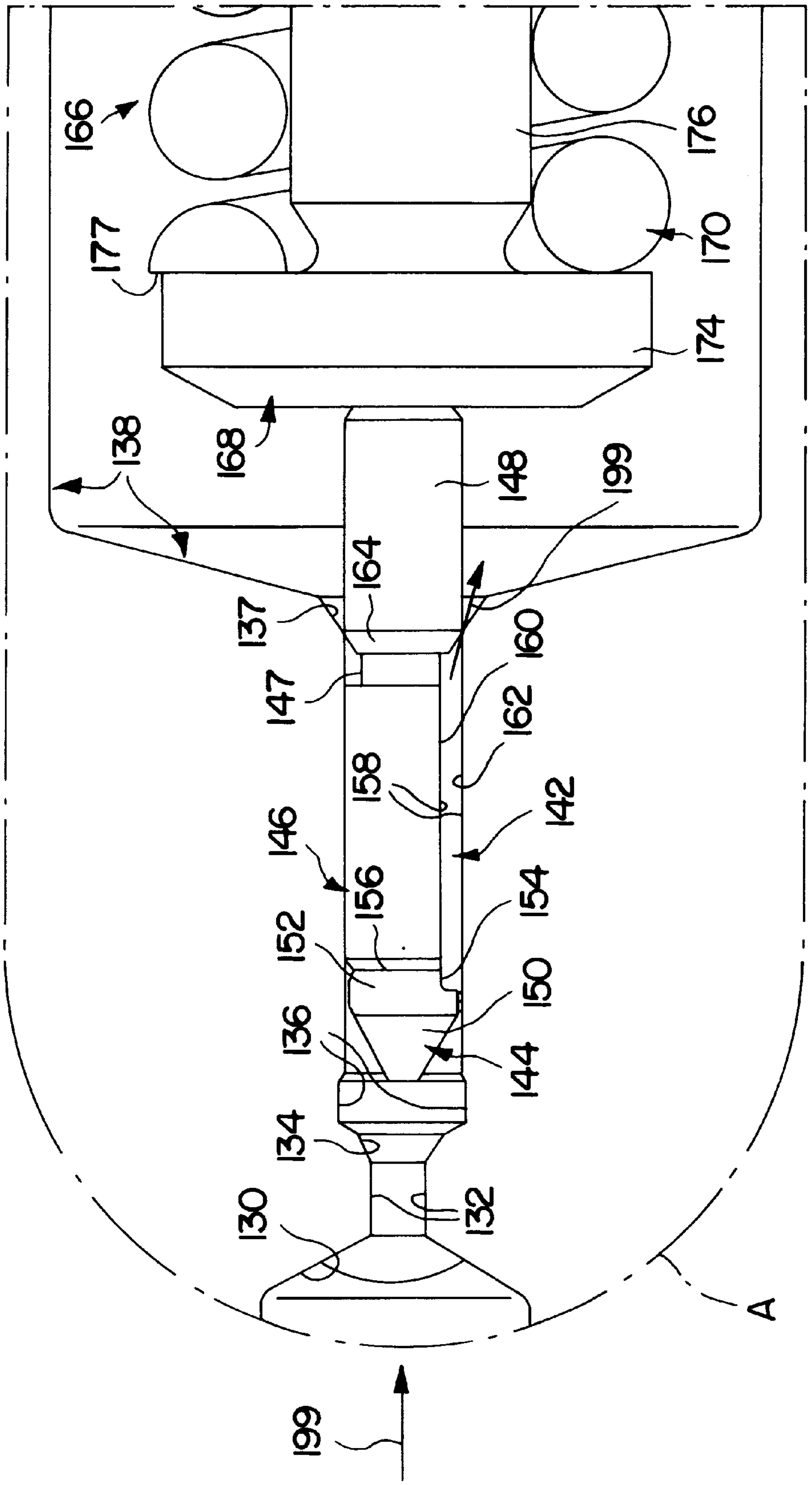
FIG. 6A is an enlarged view of portion A of FIG. 6 illustrating a first stage of pressure relief.

Referring now also to FIG. 6A, the fluid inlet 114 and outlet 116 are connected via a bore 128 extending along the longitudinal axis of the relief valve 110. The bore 128 includes a mouth portion 130 which extends from the inlet 114 and communicates with a throat portion 132. An operator seat 134 connects the throat portion 132 and a first chamber 136. A transition portion 137 connects a second chamber 138 to the first chamber 136 which are all in fluid communication with the outlet 116. Fluid from the common rail 2 (FIG. 1) may enter the inlet 114 and when, as discussed in more detail below, the relief valve 110 is open, passes through the mouth portion 130 and throat portion 132 into the first and second chambers 136 and 138 and thereafter to the outlet 116.

An operator 142 is moveably mounted for axial displacement within the bore 128. The operator 142 may be composed of, e.g., steel, and comprises a head 144, an intermediate portion 146, an annular groove 147 and a base 148. The head 144 comprises a tip 150 which has a generally truncated conical shape to engage a correspondingly shaped seat 134 and a neck 152. The neck 152 has an outer diameter which is sufficiently less than that of the inner diameter of the chamber 136 to allow the passage of a sufficient volume of fluid thereby such as is discussed above. A notch 154 may be provided for allowing the build up of a fluid reservoir and a shoulder 156 is provided which interconnects the tip 144 and larger diameter intermediate portion 146.

The intermediate portion 146 is cylindrical in shape but is shaped to define one or more passages 158 such as by providing a flat portion 160 adjacent an inner surface 162 of the first chamber 138. The intermediate portion 146 preferably has a diameter which is of a sufficient size to engage the inner surface 162 for guiding of the operator 142. Annular groove 147 is disposed about the circumference of the operator 142 and provides fluid communication adjacent a blocking surface 164 which is connected to the base 148. The blocking surface 164 has a tapered surface of a generally increasing diameter, and thus flow volume increases in correlation with the distance the blocking surface moves into the second chamber.

The base 148 of the operator 142 is partially disposed within the chamber 138 and in operative engagement with a bias assembly 166. The bias assembly 166 comprises pin member 168, spring 170 and support base 172. The pin member 168 may be composed of a strong material, such as steel, and includes a relatively large diameter contact head 174 for engaging the base 148 of the operator 142. A first shaft 176 extends from the contact head 174 which is centrally disposed within a free end 177 of the spring 170.

A second shaft 178 is provided which extends within the spring 170 and is axially aligned but separated from the first shaft 176. The second shaft 178 includes a free end 180 and fixed end 182 connected to the support base 172. The free end 180 has an increased diameter similar to a "match head" which, it will be understood, may assist in reducing the likelihood of cavitation during passage of fluid within the bore 128. Also, because of the reduced amount of space between the inside diameter of the spring 170, the enlarged outer diameter of the free end 180 may assist in reducing the movement of the spring about the second shaft 178. The second shaft 178 also includes a stepped diametrical portion 184, threads 185 and shaft connector socket 186. The socket 186 provides for connection with, e.g., a tool for adjusting the location of the second shaft 178 within the support base, as is more fully described below.

The support base 172 comprises a plug member 188 including outlets 116 (described above), a cavity 190, a shoulder 192, threads 194 and a central aperture 196. The plug member 188 may be composed of a suitably strong material, such as a metal, and may be fastened to the body 112 of the valve 110 via threads 194. The central aperture 196 is dimensioned to receive the second shaft 178 and the cavity 190 is sufficiently sized to receive the spring 170 at the shoulder 192. It will be appreciated that a variation in the location of the shoulder 192 provides for variation in the tension of the spring 170 and thus, e.g., the plug member 188 may be substituted with another plug member having a different location of the shoulder depending upon the tension desired for the spring. It will be appreciated that other structures and methods for varying the tension of the spring 170 may be employed in the practice of the present invention. In order to secure the second shaft with the plug member 188, a lock nut 198 may be threaded over the second shaft 178.

In order for the valve operator 142 to move, in the direction of arrow 199 and thereby open, the pressure of fluid must overcome the tension of the spring 170. The tension is preferably set to be overcome initially by a threshold pressure of about 1800 to 1900 bar as discussed above. Upon reaching this pressure, the pin member 168 will be urged in the direction of arrow 199 as illustrated in FIG. 6A. Fluid may now flow against the blocking surface and between the blocking surface and the inner surface 162 of the first chamber 136 into the second chamber 138 and through outlets 116. It is preferable that the dimensions of the operator 142, first chamber 136 and second chamber 138 are selected such that the flow volume and pressure may be at approximately 15 liters per hour (3.96 gal/hr) and between 300 and 600 bar as discussed above.

Similar to the operation discussed above, the blocking surface 164 will be urged further in the direction of arrows 199 by impingement of the fluid against it thereby moving it within the second chamber 138. Fluid may now pass between the groove 147 and transition portion 137 whereby the flow volume will increase substantially because of the increased cross sectional area provided for fluid flow between the groove and the transition portion. It is preferred that the increased flow volume be approximately 350 liters per hour (92.46 gal/hr) and at a pressure on the order of from about 820 to about 1120 bar as also discussed above.

Figure 7:
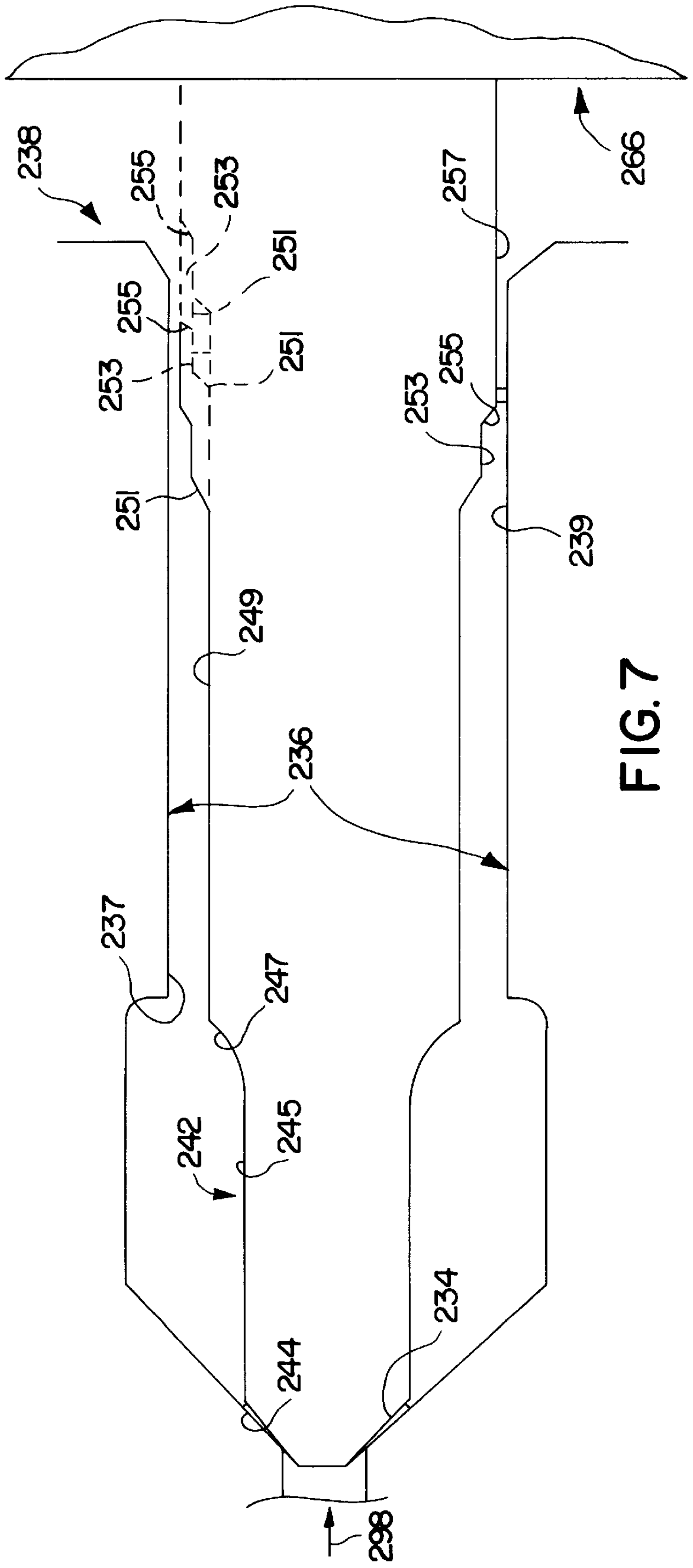
FIG. 7 is an enlarged schematic view of an operator disposed within a valve body partially shown and adjacent a bias assembly being broken away and in accordance with another embodiment of the present invention.

Another embodiment of an operator preferably being employed with a generally similar valve body to that described above in connection with FIGS. 6 and 6A is shown generally at 242 in FIG. 7. In this embodiment, the valve body also includes a first chamber 236 and a second chamber 238. The first chamber 236 comprises an operator seat 234 and a reduced diameter neck portion 237 and wall 239.

The operator 242 may be composed of a metallic substance and comprises a tip 244 and a stepped outer diametrical shape extending in the direction of fluid flow. In particular, the operator 242 comprises a front extent 245 of continuous diameter and a shoulder 247 which ramps into an intermediate extent 249 of continuous diameter. Another shoulder 251 is provided which is connected to a high volume control diameter 253. The high volume control diameter 253 is interconnected with a low volume control diameter 257 via a blocking surface 255. A bias assembly 266 is provided for biasing the operator 242 adjacent seat 234. It will be appreciated that the high volume control diameter 253 defines a cross sectional area which is less than that of the low volume control diameter 257 and thus allows a greater amount of fluid to pass between the control diameter and the wall 239 of the first chamber 236.

As illustrated by broken lines and similar to the operation discussed above, the valve operator 242 may be initially urged by fluid pressure at between about 1800 to 1900 bar in the direction of arrow 298 whereby the tip 244 will move away from seat 234. At this time, the low volume control diameter 257 of the operator 242 allows the passage of fluid between the low volume control diameter and wall 239 of the first chamber 236. The outlet flow volume and flow pressure are preferably those discussed above, i.e., approximately 15 liters per hour (3.96 gal/hr) at between 300 and 600 bar.

Once fluid engages the blocking surface 255, the blocking surface will be urged further in the direction of arrows 199 whereby it will be disposed within the second chamber 138. Accordingly, an increased volume of fluid will flow past the blocking surface 255 which, preferably, is approximately 350 liters per hour (92.46 gal/hr) at a pressure on the order of from about 820 to about 1120 bar.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the appended claims.

What is claimed is:

1. A pressure relief valve for releasing a fluid under pressure, comprising:

- a body having a bore extending from an inlet and terminating in an outlet;
- a first chamber communicating with the inlet;
- a second chamber communicating with the first chamber and the outlet and wherein the cross sectional area of the second chamber is greater than that of the first chamber;
- an operator seat disposed within said body;
- an operator movably disposed within the bore and being engageable with said operator seat and said operator comprising a blocking surface for blocking at least a portion of the flow of fluid; and a bias interconnected with said operator and urging said operator against said operator seat;

wherein when the pressure of the fluid exceeds a threshold pressure, said operator is unseated whereby fluid flows at a first flow volume, so that at least a portion of the fluid impinges said blocking surface causing said blocking surface to move within the second chamber whereby fluid flows at a second flow volume, the second flow volume being greater than the first flow volume.

2. The valve of claim 1, wherein the operator comprises a generally cylindrical shape having a stepped outer surface defining a first outer surface having a first outer diameter and a second outer surface having a second outer diameter, wherein the first outer diameter is less than the second outer diameter and wherein said blocking surface is disposed between said first outer surface and said second outer surface.

3. The valve of claim 2, wherein said blocking surface extends in a perpendicular direction with respect to that of both the first and second outer surfaces.

4. The valve of claim 1, wherein:

said threshold pressure is on the order of between 1800 and 1900 bar.

5. The valve of claim 4, wherein:

said first flow volume is approximately 15 liters per hour (3.96 gal/hr); and said second flow volume is approximately 350 liters per hour (92.46 gal/hr).

6. The valve of claim 5, wherein:

said first flow volume is at a pressure of from about 300 to about 600 bar; and said second flow volume is at a pressure of from about 820 to about 1120 bar.

7. The valve of claim 1, wherein said bias comprises a spring.

8. The valve of claim 1, wherein the operator is movable in a linear direction and said valve further comprises a linear guide.

9. The valve of claim 8, wherein the linear guide comprises:

a pair of guide members;

a tongue disposed on each of the guide members; and a pair of corresponding axial grooves disposed on opposing sides of said operator.

10. The valve of claim 1, wherein the bias comprises a bias assembly comprising:

a pin member movably disposed within the valve body and the pin member including a contact head and a first shaft extending from the contact head, the contact head being configured to be engageable with the operator;

a spring disposed about the first shaft and biasing the contact head in the direction of the operator;

a second shaft disposed within the spring and having a free end and a fixed end, the free end having a longitudinal axis which is generally coaxial with a longitudinal axis of the first shaft; and a support base interconnected with the fixed end of the second shaft, the support base having a cavity and a shoulder for receiving and engaging the spring;

wherein the first shaft and the second shaft are disposed in an axially spaced relationship which spacing defines a distance over which the operator is movable.

11. The valve of claim 10, wherein the free end of the second shaft includes an enlarged diametrical portion.

12. The valve of claim 11, wherein the support base comprises a plug member having outlets and a central bore for receipt of the second shaft and the support base also comprising a fastener for fixing the second shaft to the plug member.

13. The valve of claim 12, wherein the fastener comprises a lock nut.

14. The valve of claim 1, wherein the operator comprises:

a head having a tip portion being configured to engage the operator seat and a neck portion including a notch; p1 an intermediate portion having a greater outer diameter than the neck portion, the intermediate portion including a flat portion defining a passage communicating with the notch;

an annular groove communicating with the passage and being disposed adjacent the blocking surface; and a base portion disposed adjacent the blocking surface.

15. The valve of claim 11, wherein the operator comprises:

a head having a tip portion being configured to engage the operator seat and a neck portion including a notch;

an intermediate portion having a greater outer diameter than the neck portion, the intermediate portion including a flat portion defining a passage communicating with the notch;

an annular groove communicating with the passage and being disposed adjacent the blocking surface; and a base portion at one end being disposed adjacent the blocking surface and at another end being configured to engage the bias assembly.

16. The valve of claim 1, wherein the operator comprises a generally stepped outer cross sectional shape in the direction of fluid flow including a high volume control portion of continuous cross sectional area and a low volume control portion of a larger continuous cross sectional area than that of the high volume control portion, the blocking surface being disposed between the high volume control portion and the low volume control portion.

17. The valve of claim 11, wherein the operator comprises a generally stepped outer cross sectional shape in the direction of fluid flow including a high volume control portion of continuous cross sectional area and a low volume control portion of a larger continuous cross sectional area than that of the high volume control portion, the blocking surface being disposed between the high volume control portion and the low volume control portion and wherein the low volume control portion is engageable by the bias assembly.

18. A pressure relief valve for a common rail of a common rail fuel injection system wherein the common rail contains a pressurized fuel, comprising:

a body having a bore extending along a longitudinal axis of the body from an inlet to an outlet, said bore defined by an inner wall, said inner wall defining in the direction of fuel flow:

a first passage communicating with the inlet;

an operator seat;

a first chamber communicating with the inlet; and a second chamber communicating with the first chamber and the outlet and wherein the cross sectional area of the second chamber is greater than that of the first chamber;

an operator movably disposed within the first and second chambers and having a head configured for mating with said operator seat when in a seated position, said operator comprising a blocking surface for blocking at least a portion of the flow of fuel;

a bias connected to said operator and urging said operator against said seat;

wherein when the pressure of the fuel exceeds a threshold pressure, said operator moves a first distance from the seated position so that said blocking surface is located within said first chamber whereby fuel flows at a first flow volume and at least a portion of the fuel impinges said blocking surface causing said operator to move to an unseated portion at a second distance from the seated position so that said blocking surface moves within the second chamber whereby fuel flows at a second flow volume, the second flow volume being greater than the first flow volume.

19. The valve of claim 18, wherein the operator comprises a stepped outer cylindrical surface defining a first outer surface having a first outer diameter and a second outer surface having a second outer diameter, wherein the first outer diameter is less than the second outer diameter and wherein said blocking surface is disposed between said first outer surface and said second outer surface.

20. The valve of claim 19, wherein said blocking surface extends in a perpendicular direction with respect to that of both the first and second outer surfaces.

21. The valve of claim 18, wherein the bias comprises a bias assembly comprising:

a pin member movably disposed within the valve body and the pin member including a contact head and a first shaft extending from the contact head, the contact head being configured to be engageable with the operator;

a spring disposed about the first shaft and biasing the contact head in the direction of the operator;

a second shaft disposed within the spring and having a free end and a fixed end, the free end having a longitudinal axis which is generally coaxial with a longitudinal axis of the first shaft; and a support base interconnected with the fixed end of the second shaft, the support base having a cavity and a shoulder for receiving and engaging the spring;

wherein the first shaft and the second shaft are disposed in an axially spaced relationship which spacing defines a distance over which the operator is movable.

22. The valve of claim 21, wherein the free end of the second shaft includes an enlarged diametrical portion.

23. The valve of claim 18, wherein the operator comprises:

a head having a tip portion being configured to engage the operator seat and a neck portion including a notch;

an intermediate portion having a greater outer diameter than the neck portion, the intermediate portion including a flat portion defining a passage communicating with the notch;

an annular groove communicating with the passage and being disposed adjacent the blocking surface; and a base portion disposed adjacent the blocking surface.

24. The valve of claim 22, wherein the operator comprises:

a head having a tip portion being configured to engage the operator seat and a neck portion including a notch;

an intermediate portion having a greater outer diameter than the neck portion, the intermediate portion including a flat portion defining a passage communicating with the notch;

an annular groove communicating with the passage and being disposed adjacent the blocking surface; and a base portion at one end being disposed adjacent the blocking surface and at another end being configured to engage the bias assembly.

25. The valve of claim 18, wherein the operator comprises a generally stepped outer cross sectional shape in the direction of fluid flow including a high volume control portion of continuous cross sectional area and a low volume control portion of a larger continuous cross sectional area than that of the high volume control portion, the blocking surface being disposed between the high volume control portion and the low volume control portion.

26. The valve of claim 22, wherein the operator comprises a generally stepped outer cross sectional shape in the direction of fluid flow including a high volume control portion of continuous cross sectional area and a low volume control portion of a larger continuous cross sectional area than that of the high volume control portion, the blocking surface being disposed between the high volume control portion and the low volume control portion and wherein the low volume control portion is engageable by the bias assembly.

27. The valve of claim 18, wherein:

said threshold pressure is on the order of between 1800 and 1900 bar.

28. The valve of claim 27, wherein:

said first flow volume is approximately 15 liters per hour (3.96 gal/hr); and said second flow volume is approximately 350 liters per hour (92.46 gal/hr).

29. The valve of claim 28, wherein:

said first flow volume is at a pressure of from about 300 to about 600 bar; and said second flow volume is at a pressure of from about 820 to about 1120 bar.

30. A pressure relief valve for releasing a fluid under pressure, comprising:

a body having a bore extending from an inlet and terminating in an outlet;

a first chamber communicating with the inlet;

a second chamber communicating with the first chamber and the outlet and wherein the cross sectional area of the second chamber is greater than that of the first chamber;

an operator seat disposed within said body;

an operator movably disposed within the bore and being engageable with the operator seat and wherein the operator comprises a blocking surface for blocking at least a portion of the flow of fluid and the operator being configured to initially relieve fluid pressure and thereafter regulate fluid pressure by movement of the blocking surface between the first chamber and the second chamber so that fluid flows at a first flow volume when the blocking surface is in the first chamber and at a second flow volume when the blocking surface is in the second chamber and wherein the second flow volume is greater than the first flow volume; and a bias interconnected with said operator and urging said operator against said operator seat.

* * * * *